United States Patent
Collins

(10) Patent No.: US 6,169,776 B1
(45) Date of Patent: Jan. 2, 2001

(54) METHODS AND APPARATUS FOR EXAMINING A NUCLEAR REACTOR SHROUD

(75) Inventor: James Christopher Collins, Mooresville, NC (US)

(73) Assignee: General Electric Company, Shnectady, NY (US)

(*) Notice: Under 35 U.S.C. 154(b), the term of this patent shall be extended for 0 days.

(21) Appl. No.: 09/274,051

(22) Filed: Mar. 22, 1999

Related U.S. Application Data

(60) Provisional application No. 60/100,445, filed on Sep. 15, 1998.

(51) Int. Cl.[7] .......................... G21C 17/003; G21C 19/20
(52) U.S. Cl. .......................... 376/249; 376/258; 376/260
(58) Field of Search .................................. 376/245, 249, 376/258, 260

(56) References Cited

U.S. PATENT DOCUMENTS

| | | | |
|---|---|---|---|
| 5,156,803 | * 10/1992 | Engding et al. | 376/249 |
| 5,586,155 | * 12/1996 | Erbes et al. | 376/249 |
| 5,784,425 | * 7/1998 | Morlan | 376/249 |
| 5,878,099 | * 3/1999 | Burrows et al. | 376/260 |
| 5,898,115 | * 4/1999 | Davis et al. | 73/865.8 |

* cited by examiner

Primary Examiner—Charles T. Jordan
Assistant Examiner—K. Kevin Mun
(74) Attorney, Agent, or Firm—Armstrong Teasdale LLP

(57) ABSTRACT

Methods and apparatus for examining a nuclear reactor shroud are described. In one embodiment the inspection apparatus includes a drive system, a mast subassembly, and a scanner subassembly. The drive system includes at least two drive assemblies that engage the shroud top to move the inspection apparatus relative to the shroud. The mast subassembly is coupled to the drive system and includes a roller foot which engages the shroud bottom flange to prevent movement of the inspection apparatus during scanning of the shroud. The scanner subassembly is movably coupled to the mast subassembly and includes a horizontal frame, a scanner carriage having a turntable, a movable plate and a scanner. The scanner subassembly coupled to the mast subassembly provides the scanner with four degrees of motion.

23 Claims, 7 Drawing Sheets

METHODS AND APPARATUS FOR EXAMINING A NUCLEAR REACTOR SHROUD

CROSS-REFERENCE TO RELATED APPLICATIONS

This application claims the benefit of U.S. Provisional Application No. 60/100,445, filed Sep. 15, 1998.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide.

Intergranular Stress Corrosion Cracking (IGSCC) is a known phenomenon occurring in reactor components, such as structural members, shrouds, piping, fasteners, and welds, exposed to stress in a corrosive environment. Typically, IGSCC initiates from a crevice at the base material along a weld in what is referred to as the heat affected zone. Reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to IGSCC.

Over the life of the reactor, the shroud is often inspected to verify integrity. For example, the shroud welds must be periodically inspected for Intergranular Stress Corrosion Cracking (IGSCC). Based upon such inspections, the shroud may require either repair or replacement.

Known methods of inspecting shroud welds require an operator to stand on a refuel or auxiliary bridge positioned above the RPV and to manipulate inspection tooling within the RPV. Particularly, the operator couples the inspection tooling to a pole, inserts the pole and tooling into the RPV, and then positions the tooling adjacent to the weld to be examined. Because different inspection tooling is required to inspect different welds, i.e., vertical, attachment, and circumferential welds, the operator must periodically change the tooling coupled to the pole. In addition, due to the reactor internals configuration and the piping system obstructions, the operator typically must make extensive use of the bridge to inspect each shroud weld. This extensive bridge use substantially prevents other repair and inspection operations from being conducted simultaneously with the weld inspections.

It would be desirable to provide a shroud inspection apparatus particularly suitable for use in nuclear reactor applications which is easy to use and does not require support from the refuel or auxiliary bridge for performing shroud inspections. It would also be desirable to provide such an apparatus which minimizes the number of insertions, removals, and tooling change-out sequences to facilitate reducing reactor shut-down time. It would further be desirable to provide such an apparatus which navigates around anticipated shroud obstructions to facilitate reducing inspection time and operator activity.

BRIEF SUMMARY OF THE INVENTION

These and other objects may be attained by an inspection apparatus which, in one embodiment, inspects a shroud, specifically shroud welds, in a nuclear reactor. The inspection apparatus includes a drive system having four drive assemblies coupled to three support frame members. Each drive assembly includes dual cylindrically shaped drive wheels sized to rest on the shroud and move the inspection apparatus relative to the shroud. Each drive wheel pair independently moves between a position resting on the shroud top and a position rotated up and away from the shroud top. The drive assembly is maintained in proper radial position by inner and outer guide rollers. The inner guide rollers ride along the inner surface of the upper shroud circumference and the outer guide roller ride along the outer surface of the upper shroud circumference.

The inspection apparatus also includes a mast subassembly and a scanner subassembly. The mast subassembly includes a substantially elongate member and a roller foot coupled to the elongate member second end. The mast subassembly elongate member first end is coupled to the drive system support frame. The scanner subassembly has a substantially elongate horizontal frame, a scanner carriage having a turntable, and an ultrasonic scanner. The horizontal frame is movably coupled to the mast subassembly elongate member.

The vertical position of the scanner subassembly is changed by moving the horizontal frame between the ends of the mast subassembly. The horizontal position of the scanner is controlled by movement of the scanner carriage between the horizontal frame ends. The turntable rotatably couples the scanner to the scanner carriage. The scanner additionally has a fine vertical movement on the scanner carriage. The four degrees of motion allows the scanner subassembly to perform volumetric examinations of circumferential, vertical, and attachment shroud welds.

Additionally, the inspection apparatus includes an umbilical control system which uses gravity to feed an umbilical cable to a proper position along side the mast and couples the scanner subassembly and a data collection system. The umbilical control system maintains an appropriate amount of umbilical cable between the data collection system and the scanner subassembly.

To scan the shroud, and more specifically, the shroud welds, the inspection apparatus is lowered into the RPV until the drive system drive wheels rest on the shroud top. The mast subassembly is then positioned adjacent to the shroud so that the mast subassembly roller foot is tangent to the shroud. The drive assembly wheel and mast subassembly, including the roller foot, clamp the inspection apparatus to the shroud with the aid of a kicker clamp. The kicker clamp extends from the mast and engages the RPV wall which causes the bottom roller foot to engage the shroud and provides a fixed rigid structure from which to perform shroud inspections. This rigidity ensures no wandering of the inspection apparatus resulting from frictional forces during scanner subassembly motion to help reduce azimuthal positioning errors.

Once the inspection apparatus is clamped in position, the scanner subassembly scans the shroud welds. Particularly, in one embodiment, the scanner subassembly is moved adjacent to the mast subassembly first end with the scanner carriage adjacent the horizontal frame first end. The scanner carriage is then moved between the first and second ends of the horizontal frame as the scanner performs a complete scan for each weld. The horizontal frame is then moved toward the mast subassembly second end a distance equal to the height of the completed scan. The fine vertical movement can then be used to precisely control the vertical position of the scanner. This scan procedure is repeated until the horizontal frame is adjacent to the mast subassembly second end. The mast subassembly kicker clamp is then retracted away from the RPV wall and the drive system moves the inspection apparatus relative to the shroud a distance equal to the width of the horizontal frame. This scan procedure is repeated until the inspection apparatus encounters an obstruction at the shroud top or the entire shroud has been scanned.

If the drive system encounters an obstruction, the obstruction must be avoided or stepped around. In stepping around the obstruction, one of the drive assemblies currently retracted from the shroud is moved so that the drive wheels rest on the shroud top. The drive assembly encountering the obstruction is then moved so that the drive wheels are rotated inward away from the shroud. As a result, the inspection apparatus may be moved relative to the shroud.

Should the inspection apparatus encounter the obstruction with a second drive assembly, a drive assembly retracted from the shroud can be placed on the shroud top and the drive assembly currently encountering the obstruction is rotated inward away from the shroud. This stepping around process is repeated as each drive assembly encounters the obstruction. Additionally, due to the spacing of the drive assemblies on the support frame only two drive assemblies are necessary to support and move the inspection apparatus. Therefore the inspection apparatus can avoid two simultaneous obstructions as long as two of the four drive assemblies are resting on the shroud top.

Upon completion of scanning the entire shroud, the inspection apparatus is removed from the RPV. Specifically, the kicker clamp is disengaged from the RPV wall. The inspection apparatus is then lifted until the mast subassembly is above the shroud top and then removed from the RPV. The resulting scan data is analyzed to determine any necessary maintenance activities.

The above-described apparatus facilitates inspection of a nuclear reactor shroud without requiring support from the refuel or auxiliary bridge. In addition, such inspection apparatus avoids shroud top obstructions allowing examination of the entire shroud with a single insertion and removal of the inspection apparatus, therefore saving time.

DETAILED DESCRIPTION OF THE INVENTION

Figure 1:
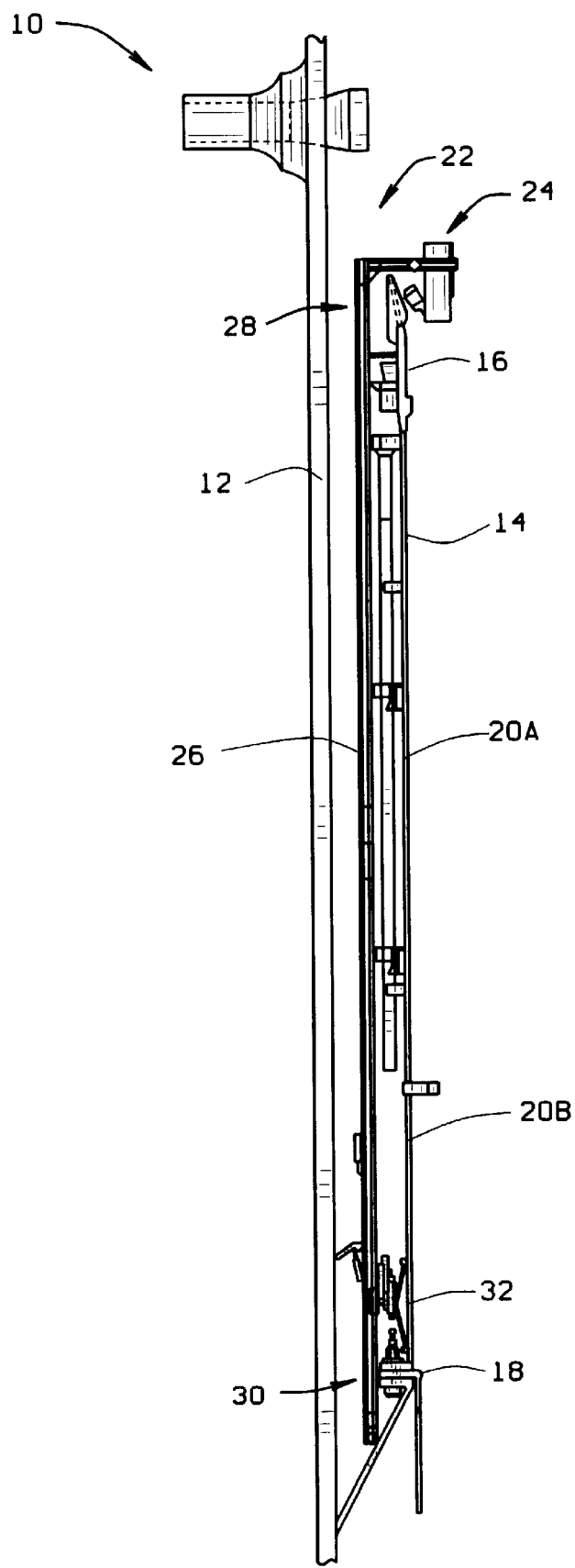
FIG. 1 is a cut away side view of a nuclear reactor pressure vessel with an inspection apparatus resting on a shroud.

FIG. 1 is a cut away side view of a reactor pressure vessel 10 including a sidewall 12 and a shroud 14 having a shroud top 16, a shroud bottom flange 18, and welds 20A and 20B. Shroud 14 may contain many welds extending both vertically and horizontally. Welds 20A and 20B are shown for exemplary purposes. Intergranular Stress Corrosion Cracking (IGSCC) inspection of shroud welds 20A and 20B is completed using an inspection apparatus 22. Inspection apparatus 22 includes a drive system 24, a mast subassembly 26 and a scanner subassembly 32. Mast assembly 26 has a first end 28 and a second end 30.

Figure 2:
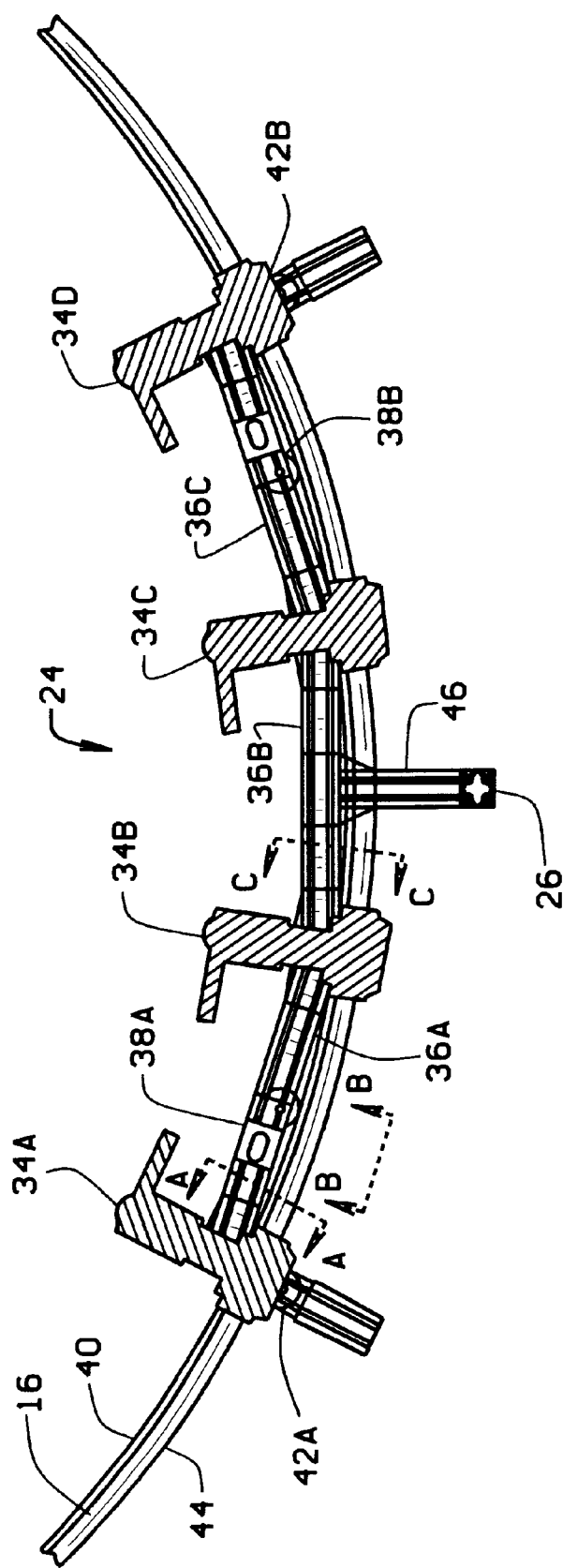
FIG. 2 is a top view of the inspection apparatus shown in FIG. 1.

Referring to FIG. 2, drive system 24 includes drive assemblies 34A, 34B, 34C, and 34D. Support frame member 36A extends between and is coupled to drive assemblies 34A and 34B. Support frame member 36B extends between and is coupled to drive assemblies 34B and 34C. Support frame member 36C extends between and is coupled to drive assemblies 34C and 34D. Guide roller assemblies 38A and 38B are coupled to support frame members 36A and 36C respectively. Guide roller assemblies 38A and 38B are configured to contact and roll along an inside surface 40 of shroud 14. Guide roller assemblies 42A and 42B are coupled to support frame members 36A and 36C respectfully at the location where drive assemblies 34A and 34D are coupled to drive system 24. Guide roller assemblies 42A and 42B are configured to contact and roll along the outside surface 44 of shroud 14. Mast support member 46 extends between and is coupled to frame support member 36B and to first end 28 of mast 26.

Figure 3:
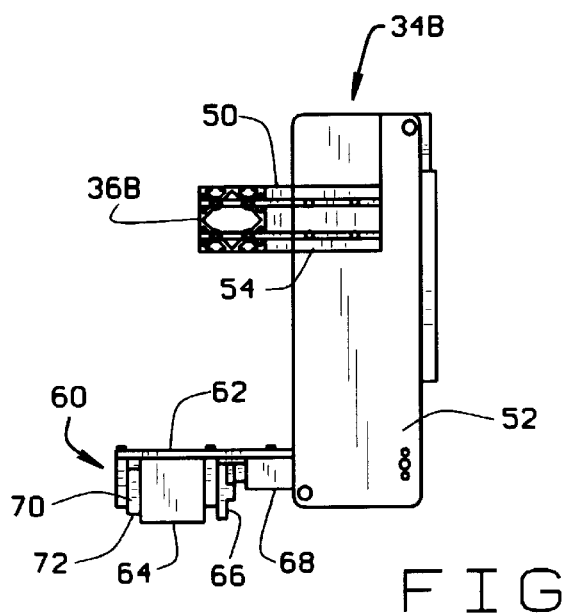
FIG. 3 is an exploded side view of a drive assembly.
Figure 4:
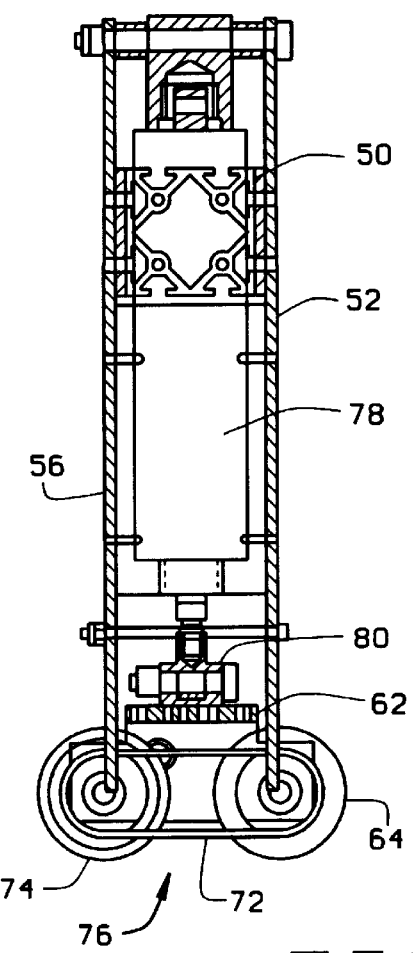
FIG. 4 is an exploded front view of the drive assembly shown in FIG. 3.

Referring to FIGS. 3 and 4, FIG. 3 is an exploded side view of drive assembly 34B along line C—C of FIG. 2. FIG. 4 is an end view of drive member 34B. Drive assemblies 34A, 34C and 34D are identical to drive assembly 34B, and are therefore not shown. Drive support channel member 50 extends from and is coupled to support frame member 36B. Drive assembly plate 52 is coupled to the side of drive support channel member 50. Support bracket 54 overlies and is coupled to plate 52 and support member 50 for added support. A second drive assembly plate 56 (shown in FIG. 4) is coupled to an opposing side of drive support channel member 50. Drive wheel assembly 60 is pivotly attached to plate 52. Roller assembly 60 includes wheel mounting plate 62 and drive wheel 64 which is substantially cylindrically shaped and configured to ride on shroud top 16. Spur gear 66 couples wheel 64 to motor 68 at a first end of wheel 64. Timing belt pulley 70 is located at a second end of wheel 64. Timing belt 72 engages pulley 70 and couples wheel 64 with wheel 74. Drive wheels 64 and 74 form a drive wheel pair 76. Drive assemblies 34A, 34C, and 34D each contain a drive wheel pair 76. Mounting plate 62 is connected to air ram 78 through swivel block 80. The motion of air ram 78 causes wheel pair 76 to rotate into and out of engagement with shroud top 16.

Figure 5:
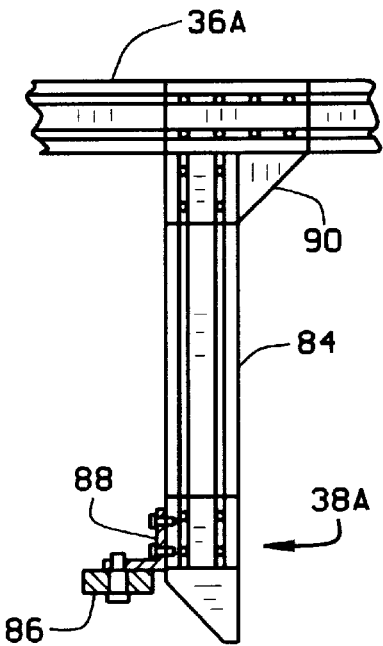
FIG. 5 is an exploded side view of a guide wheel assembly.

FIG. 5 is an exploded side view of guide roller assembly 38A along line B—B of FIG. 2. Guide roller 38B is identical to guide roller 38A, and therefore is not shown. Guide roller assembly 38A includes support member 84 extending from and coupled to frame support member 36A. Roller 86 is coupled to the end of support member 84 through an L-shaped bracket 88. Support bracket 90 overlies and is coupled to frame support member 36A and support member 84 for added support.

Figure 6:
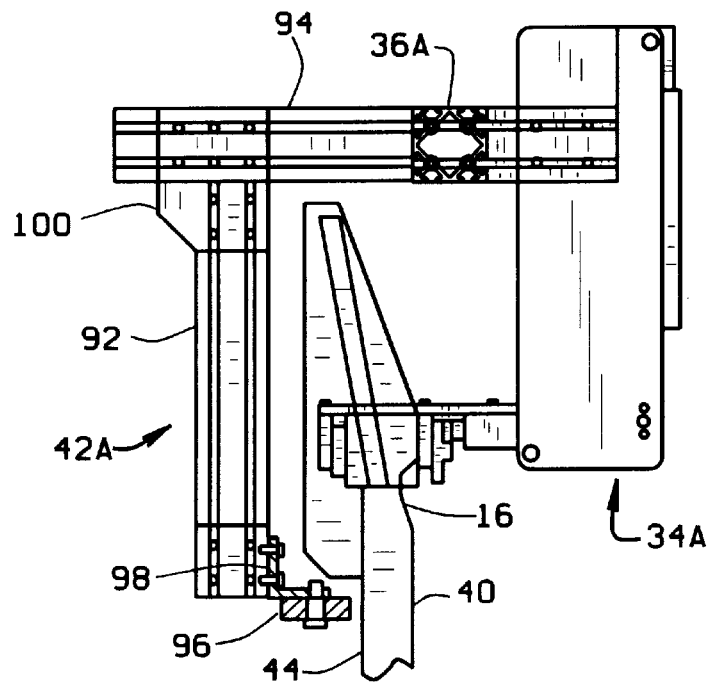
FIG. 6 is an exploded side view of a guide wheel assembly and drive assembly with a drive wheel engaging the shroud top.

FIG. 6 is an exploded side view of drive assembly 34A and guide roller assembly 42A along line A—A of FIG. 2. Roller assembly 42A includes support members 92 and 94 connected to form an L-shaped support. Support member 94 is coupled to frame support member 36A. Wheel 96 is coupled to the bottom of support member 92 with an L-shaped bracket 98. A support bracket 100 overlies and is coupled to support member 92 and 94 for added support and rigidity.

Figure 7:
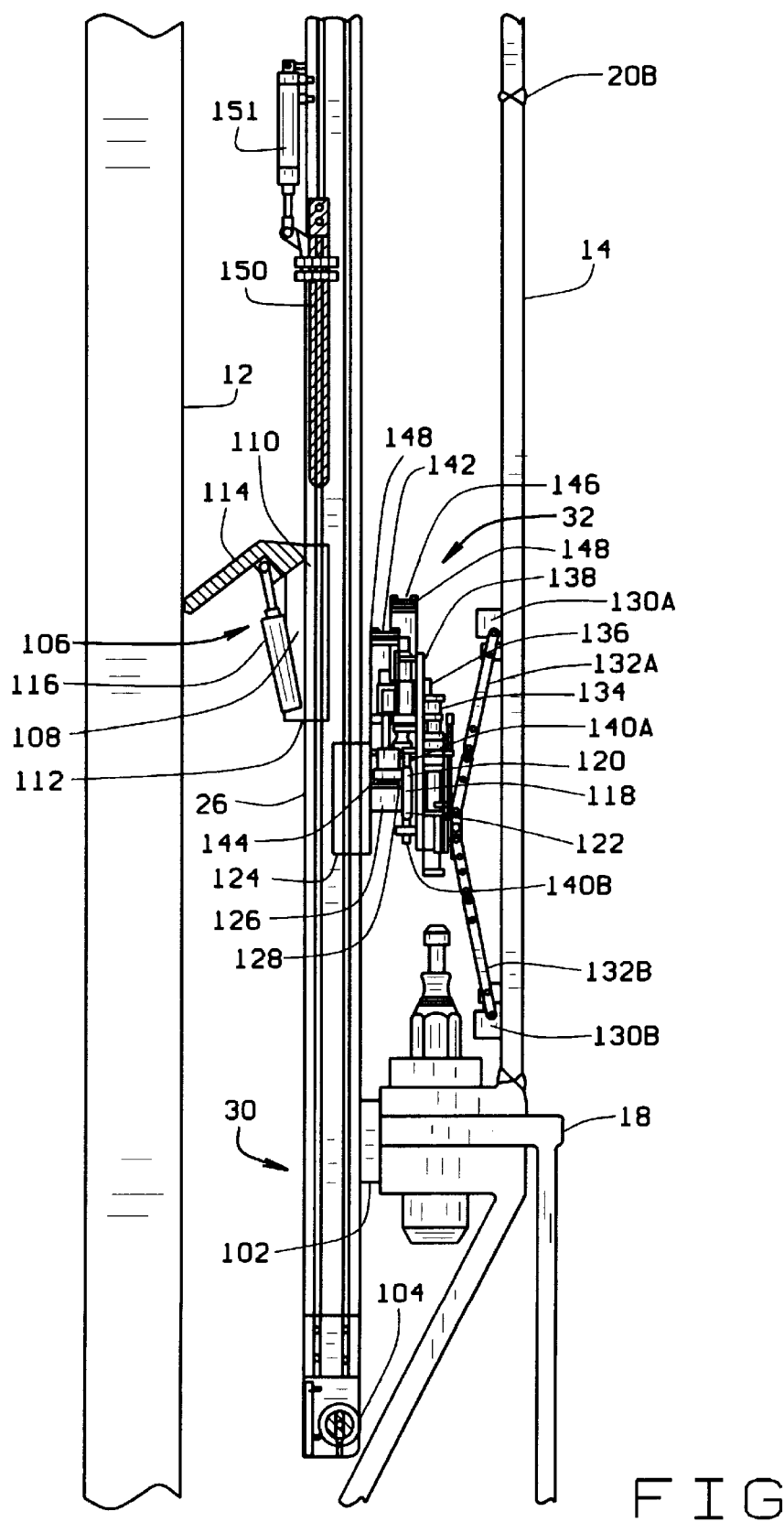
FIG. 7 is an exploded view of the lower part of FIG. 1.

Referring to FIG. 7, a roller foot 102 is coupled to mast 26 at end 30 and is configured to contact and roll along shroud bottom flange 18. A kicker clamp 106 is coupled to mast 26 by a mounting bracket 108 having a first end 110 and a second end 112. A kicker clamp engagement arm 114 is pivotly coupled to bracket end 110. An air ram 116 extends between and is coupled to bracket end 112 and engagement arm 114. When air ram 116 is activated, it causes engagement arm 114 to move into engagement with reactor pressure vessel sidewall 12.

A horizontal frame member 118, having an upper portion 120 and a lower portion 122, is connected to a slidable mounting bracket 124 by a horizontal frame connecting member 126. Slidable mounting bracket 124 slidably couples horizontal frame member 118 to mast 26 so that horizontal frame member 118 can move between mast first end 28 and mast second end 30. A gear rack 128 is attached to upper portion 120 of horizontal frame member 118.

Scanner subassembly 32 includes transducers 130A and 130B coupled to transducer mounting arms 132A and 132B respectfully. Transducer mounting arms 132A and 132B extend from a movable mounting plate 134. Movable mounting plate 134 is movably coupled to a turntable 136. Turntable 136 is rotatably coupled to scanner mounting plate 138.

Rollers 140A and 140B are coupled to scanner mounting plate 138 and are configured to engage horizontal frame member 118. Roller 140A engages horizontal frame member upper portion 120 and roller 140B engages horizontal frame member lower portion 122.

A drive motor 142, coupled to scanner mounting plate 138, includes a drive gear 144 configured to engage gear rack 128. Scanner subassembly also includes turntable motor 146.

Drive motors 142, 146, and 68 (shown in FIG. 3) are servo-control type motors. Servo-control motors provide closed loop feedback through encoders 148 coupled to motors 142, 146, and 68. Encoders 148 count the revolutions of motors 142, 146, and 68. The revolutions can then be converted to a linear movement that corresponds to a true position of transducers 130A and 130B.

A kicker arm 150 is coupled to mast 26. An air ran 151 pivots kicker arm 150 out and into engagement with sidewall 12 to guide apparatus 22 during installation in pressure vessel 10.

Figure 8:
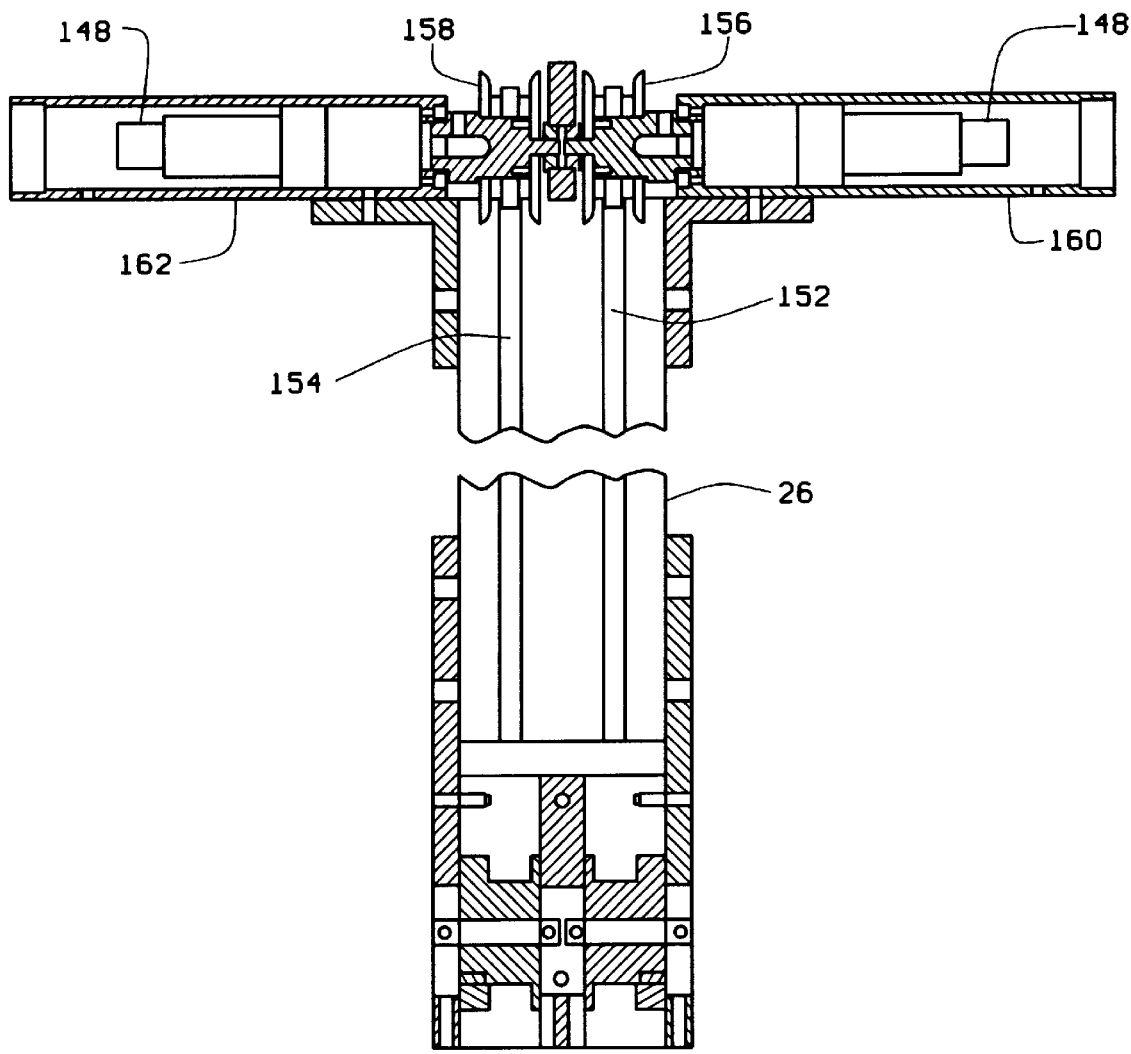
FIG. 8 is a back view of the vertical drive assembly.

Referring to FIG. 8, drive belts 152 and 154 are engaged by drive sprockets 156 and 158 respectively. Drive motors 160 and 162 are coupled to drive sprockets 156 and 158 respectively. Drive belts 152 and 154 extend down mast 26 and around pulley 104 (shown in FIG. 7). Drive belt 152 is attached to horizontal frame member 124 (shown in FIG. 7) and provides vertical movement for horizontal frame member 118 (shown in FIG. 7). Drive belt 154 is coupled to a camera (not shown) that is configured to move up and down mast 26 to provide an operator on the spot vision of scanner subassembly 32. Encoders 148 are coupled to drive motors 160 and 162 to provide position information.

Figure 9:
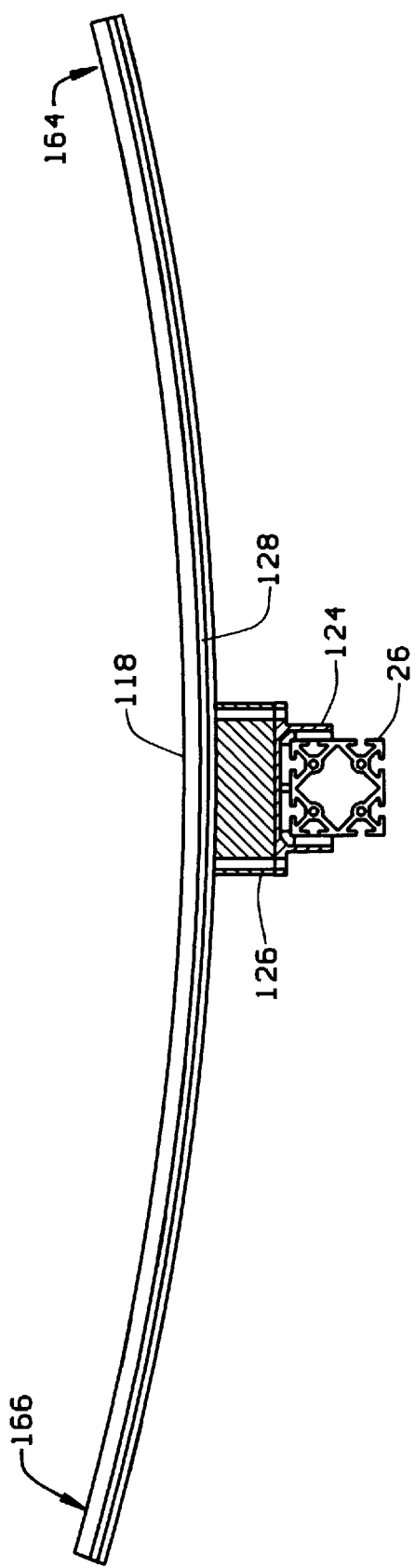
FIG. 9 is a cut away top view of the horizontal inspection apparatus illustrating the horizontal frame member.

Referring to FIG. 9, horizontal frame member 118 includes a first end 164 and a second end 166. Gear rack 128 is attached to horizontal frame member 118 and is positioned to face mast 26 so as to engage drive gear 144 (shown in FIG. 7).

In operation, inspection apparatus 22 is inserted into reactor pressure vessel 10 so that drive system 24 engages shroud 14. Specifically, drive assemblies 34A, 34B, 34C, and 34D engage shroud top 16 with guide rollers 38A and 38B engaging shroud inner surface 40 and guide rollers 42A and 42B engaging shroud outer surface 44. Roller foot 102 is then moved into engagement with shroud bottom flange 18 by activating air ram 116 which causes kicker clamp engagement arm 114 into engagement with reactor pressure vessel sidewall 12. The engagement of arm 114 against sidewall 12 causes mast 26 to move towards shroud 14 until roller foot 102 engages shroud bottom flange 18. Drive system 24 and mast subassembly 26, including roller foot 102 and kicker clamp 106, clamp inspection apparatus 22 to shroud 14. This clamping provides rigidity to hold inspection apparatus 22 in position, ensuring no wandering of apparatus 22 caused by frictional forces during scanner subassembly 32 motion.

After clamping inspection apparatus 22 in position, shroud weld 20A can be inspected. Scanner subassembly 32 is first positioned adjacent to shroud weld 20A using motor 160. Specifically, vertical drive motor 160 using belt 152 moves horizontal frame member 118 so that scanner assembly 32 is positioned adjacent to shroud weld 20A. Scanner assembly 32 is then moved to horizontal frame first end 164. A first scan then begins by scanning shroud weld 20A as scanner assembly 32 scans an area of weld 20A. Scanner data is transmitted through an umbilical cable (not shown), that extends along mast 26, to a remote data collection system (not shown). After the first area is scanned, turntable 135 rotates transducers 130A and 130B so that weld 20A can be scanned from various angles. Upon scanning a weld first area at all required angles, resulting in a volumetric scan, scanner assembly 32 is then repositioned over an adjacent area of shroud weld 20A by moving scanner assembly 32 towards horizontal frame second end 166. Scanner assembly 32 continues scanning each location along weld 20A until scanner assembly 32 reaches horizontal frame second end 166. Upon reaching second end 166, vertical motor 160 moves scanner assembly 32 adjacent weld 20B. In one embodiment, scanner subassembly 32 is then repositioned to horizontal frame first end 164. The above-described scan process is then repeated for all areas along weld 20B accessible without moving inspection apparatus 22 relative to shroud 14. Similarly, the described scan process is repeated for shroud welds between shroud top 16 and shroud bottom 18 without moving inspection apparatus 22 relative to shroud 14. This scanning process is repeated until horizontal frame 118 reaches second end 30 of mast subassembly 26.

Thereafter, inspection apparatus 22 must be repositioned to the next portion of shroud 14 to be scanned. Prior to moving, de-activation of air ram 116 releases kicker clamp 106. Drive system 24 is then activated by remote motion control system (not shown) and drive assemblies 34A, 34B, 34C and 34D move inspection apparatus 22 relative to shroud 14. Specifically, drive assemblies 34A, 34B, 34C and 34D are activated so that each drive wheel pairs 76 rotate causing inspection apparatus 22 to move relative to shroud 14. As inspection apparatus 22 is moved, position encoders 148 integral with motors 142, 146, 68, 160 and 162 provides movement information to remote motion control system (not shown). Inspection apparatus 22 is moved by a distance equal to the horizontal width of the first scan. After moving inspection apparatus 22 the appropriate distance, kicker clamp arm 106 is re-engaged to sidewall 12. In one embodiment, horizontal frame 118 is then moved to mast subassembly first end 28 and scanner assembly 32 is moved to horizontal frame first end 164. Thereafter, the above-described scan process implemented to conduct the first shroud portion scan is repeated for all additional shroud welds.

If, during repositioning of inspection apparatus 22, drive system 24 encounters an obstacle, each drive assembly 34A, 34B, 34C and 34D is capable of being independently engaged or disengaged from shroud top 16. For example, upon drive assembly 34B encountering an obstacle, drive wheel pair 76 is disengaged from shroud top 16. Specifically, air ram 78 is activated causing drive wheel pair 76 to rotate out of engagement with shroud top 16. When the obstacle is passed, air ram 78 is de-activated causing drive wheel pair 76 to re-engage with shroud top 16. With drive assembly 34B disengaged from shroud top 16, drive assemblies 34A, 34C and 34D support the weight and move inspection apparatus 22 relative to shroud 14.

In one embodiment, only two drive assemblies are engaged with shroud top 16 at any one time, for example 34A and 34D. Upon drive assembly 34A encountering an obstacle, drive assembly 34B is moved into engagement and drive assembly 34A is disengaged from shroud top 16 as described above. Upon drive assembly 34B encountering the obstruction, disengaged drive assembly 34A is re-engaged to shroud top 16 as described above, and drive assembly 34B is disengaged. Drive assemblies 34C and 34D are similarly engaged and disengaged to shroud 14 to avoid shroud top obstacles. Drive assemblies 34A, 34B, 34C and 34D are spaced so that only two of such drive assemblies are required at any time to support and move inspection apparatus 22.

Upon scanning all portions of shroud 14, inspection apparatus 22 is removed from RPV 10. Specifically, kicker clamp 106 is released by de-activating air ram 116. Inspection apparatus 22 is then raised from RPV 10 until mast assembly 26 is elevated above RPV 10 such that inspection apparatus 22 can be removed.

The above-described assembly facilitates inspection of a nuclear reactor shroud without requiring support from the refuel or auxiliary bridge. In addition, such apparatus avoids shroud top obstructions allowing examination of the entire shroud with a single insertion and removal of the inspection apparatus, therefore saving time.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An automated inspection apparatus for inspecting shroud welds of a shroud in a reactor pressure vessel of a nuclear reactor, the shroud having a bottom flange and a top, the reactor pressure vessel having a sidewall, said apparatus comprising:
   a drive system comprising a plurality of drive assemblies, a plurality of support frame members coupled to said drive assemblies, and a plurality of guide roller assemblies coupled to said support frame members, said drive system configured to movably engage the shroud top;
   a mast subassembly coupled to said drive system; and
   a scanner subassembly movably coupled to said mast subassembly, said scanner subassembly configured to inspect the shroud welds.

2. An inspection apparatus in accordance with claim 1 wherein each of said drive assemblies comprises:
   a drive support channel member coupled to at least one of said support frame members;
   a first and a second drive assembly support plate coupled to said support frame member on opposing sides of said support channel member; and
   a wheel assembly comprising a drive wheel pair, said wheel assembly pivotly coupled to said support plates, said drove wheel pair configured to engage the shroud top.

3. An inspection apparatus in accordance with claim wherein 2 wherein said wheel assembly is configured to move between a first position, where said drive wheel pair engages the shroud top and a second position, where said drive wheel pair does not engage the shroud top.

4. An inspection apparatus in accordance with claim 2 wherein each said drive wheel pair comprises a first and a second drive wheel, said first drive wheel coupled to a drive motor and said second drive wheel coupled to said first drive wheel with a timing belt, wherein said first drive wheel and drive motor, and said second drive wheel is movably coupled to a wheel mounting plate, said wheel mounting plate movably coupled to said first and second support plates.

5. An inspection apparatus in accordance with claim 4 wherein said drive motor comprises an encoder coupled to said drive motor, said encoder configured to provide inspection apparatus position data.

6. An inspection apparatus in accordance with claim 1 wherein said scanner subassembly comprises a scanner and a horizontal frame, said scanner movably coupled to said horizontal frame, said horizontal frame movably coupled to said mast subassembly.

7. An inspection apparatus in accordance with claim 6 wherein said scanner subassembly further comprises a turntable rotatably coupling said scanner to said horizontal frame.

8. An inspection apparatus in accordance with claim 7 wherein said scanner subassembly further comprises a movable plate movably coupling said scanner to said turntable, said movable plate being linearly movable.

9. An inspection apparatus in accordance with claim 1 wherein said drive system further comprises a motor coupled to said scanner subassembly and configured to control a vertical position of said scanner subassembly.

10. An inspection apparatus in accordance with claim 9, wherein said motor comprises an encoder coupled to said motor, said encoder configured to provide inspection apparatus position data.

11. An inspection apparatus in accordance with claim 1 wherein said drive system comprises four drive assemblies and three support frame members.

12. An inspection apparatus in accordance with claim 1 wherein said mast subassembly comprises a first end, a second end, a kicker clamp, and at least one roller foot, said first end coupled to said drive system, said roller foot coupled to said second end and configured to engage the shroud bottom flange, and said kicker clamp connected to said mast between said first and second ends and configured to move into engagement with the reactor pressure vessel sidewall.

13. An automated inspection apparatus for inspecting shroud welds of a shroud in a reactor pressure vessel of a nuclear reactor, the shroud having a bottom flange and a top, the reactor pressure vessel having a sidewall, said apparatus comprising:
   a drive system comprising a plurality of drive assemblies, a plurality of support frame members coupled to said drive assemblies, and a plurality of guide roller assemblies coupled to said support frame members, said drive system configured to movably engage the shroud top;
   a mast subassembly coupled to said drive system, said mast subassembly comprising a first end, a second end, a kicker clamp, and at least one roller foot, said first end coupled to said drive system, said roller foot coupled to said second end and configured to engage the shroud bottom flange, and said kicker clamp connected to said mast between said first and second ends and configured to move into engagement with the reactor pressure vessel sidewall; and a scanner subassembly movably coupled to said mast subassembly, said scanner subassembly configured to inspect the shroud welds.

14. An inspection apparatus in accordance with claim 13 wherein each of said drive assemblies comprises:

a drive support channel member coupled to at least one of said support frame members;

a first and a second drive assembly support plate coupled to said support channel member on opposing sides of said support channel member;

a wheel assembly comprising a drive wheel pair, said wheel assembly pivotly coupled to said support plates, said drive wheel pair configured to engage the shroud top.

15. An inspection apparatus in accordance with claim 14 wherein said wheel assembly is configured to move between a first position, where said drive wheel pair engages the shroud top and a second position, where said drive wheel pair does not engage the shroud top.

16. An inspection apparatus in accordance with claim 14 wherein each said drive wheel pair comprises a first and a second drive wheel, said first drive wheel coupled to a drive motor and said second drive wheel coupled to said first drive wheel with a timing belt, wherein said first drive wheel and drive motor, and said second drive wheel is movably coupled to a wheel mounting plate, said wheel mounting plate movably coupled to said first and second support plates.

17. An inspection apparatus in accordance with claim 16 wherein said drive motor comprises an encoder coupled to said drive motor, said encoder configured to provide inspection apparatus position data.

18. An inspection apparatus in accordance with claim 13 wherein said scanner subassembly comprises a scanner and a horizontal frame, said horizontal frame movably coupled to said mast subassembly.

19. An inspection apparatus in accordance with claim 18 wherein said scanner subassembly further comprises a turntable rotatably coupling said scanner to said horizontal frame.

20. An inspection apparatus in accordance with claim 19 wherein said scanner subassembly further comprises a movable plate movably coupling said scanner to said turntable, said movable plate being linearly movable.

21. An inspection apparatus in accordance with claim 13 wherein said drive system further comprises a motor coupled to said scanner subassembly and configured to control a vertical position of said scanner subassembly.

22. An inspection apparatus in accordance with claim 21, wherein said motor comprises an encoder coupled to said motor, said encoder configured to provide inspection apparatus position data.

23. An inspection apparatus in accordance with claim 13 wherein said drive system comprises four drive assemblies and three support frame member.

* * * * *

UNITED STATES PATENT AND TRADEMARK OFFICE
CERTIFICATE OF CORRECTION

PATENT NO. : 6,169,776 B1
DATED : January 2, 2001
INVENTOR(S) : James Christopher Collins It is certified that error appears in the above-identified patent and that said Letters Patent is hereby corrected as shown below:

<u>Claim 3, column 8,</u>
Line 6, delete the first occurrence of "wherein".

Signed and Sealed this

Thirtieth Day of October, 2001

*Attest:*

*Attesting Officer*

NICHOLAS P. GODICI
*Acting Director of the United States Patent and Trademark Office*